United States Patent
Zhang et al.

(10) Patent No.: US 11,252,085 B2
(45) Date of Patent: Feb. 15, 2022

(54) LINK RESOURCE TRANSMISSION METHOD AND APPARATUS

(71) Applicant: HUAWEI TECHNOLOGIES CO., LTD., Shenzhen (CN)

(72) Inventors: Hanging Zhang, Jakarta (ID); Chunhui Chen, Dongguan (CN); Ting Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/231,621

(22) Filed: Apr. 15, 2021

(65) Prior Publication Data

US 2021/0234796 A1 Jul. 29, 2021

Related U.S. Application Data

(63) Continuation of application No. PCT/CN2018/113179, filed on Oct. 31, 2018.

(51) Int. Cl.
*H04L 12/721* (2013.01)
*H04L 12/26* (2006.01)
*H04L 12/751* (2013.01)
*H04L 12/717* (2013.01)

(52) U.S. Cl.
CPC .......... *H04L 45/32* (2013.01); *H04L 43/0817* (2013.01); *H04L 45/02* (2013.01); *H04L 45/42* (2013.01)

(58) Field of Classification Search
CPC ..... H04L 45/32; H04L 43/0817; H04L 45/02; H04L 45/42
See application file for complete search history.

(56) References Cited

U.S. PATENT DOCUMENTS

| | | | |
|---|---|---|---|
| 2011/0185047 A1* | 7/2011 | Vaidyanathan | H04L 41/0856 709/220 |
| 2014/0010117 A1 | 1/2014 | Lindem, III et al. | |
| 2016/0156523 A1 | 6/2016 | Luo et al. | |

(Continued)

FOREIGN PATENT DOCUMENTS

| | | |
|---|---|---|
| CN | 104301219 A | 1/2015 |
| CN | 106330527 A | 1/2017 |

(Continued)

*Primary Examiner* — Tonia L Dollinger
*Assistant Examiner* — Jihad K Boustany
(74) *Attorney, Agent, or Firm* — Rimon PC

(57) ABSTRACT

Embodiments of this application provide a link resource transmission method and apparatus. The method includes the following steps. A first node floods first control routing information, where the first control routing information includes an identifier of an area in which the first node is located. A second node floods second control routing information, where the second control routing information includes an identifier of an area in which the second node is located. The first node determines, through comparison, whether the identifier of the area in which the first node is located is consistent with the identifier of the area in which the second node is located. When the identifier of the area in which the first node is located is consistent with the identifier of the area in which the second node is located, the first node transmits link data information of the first node to the second node.

10 Claims, 9 Drawing Sheets

(56) References Cited

U.S. PATENT DOCUMENTS

2016/0164739 A1\*  6/2016  Skalecki ................. H04L 41/12
                                                        370/389
2016/0352623 A1\*  12/2016  Jayabalan ........... H04L 41/0654

FOREIGN PATENT DOCUMENTS

| CN | 106973018 A | 7/2017 |
| CN | 107276897 A | 10/2017 |
| CN | 107370675 A | 11/2017 |
| WO | 2014184624 A1 | 11/2014 |
| WO | 2017193733 A1 | 11/2017 |

\* cited by examiner

LINK RESOURCE TRANSMISSION METHOD AND APPARATUS

CROSS-REFERENCE TO RELATED APPLICATIONS

This application is a continuation of International Application No. PCT/CN2018/113179, filed on Oct. 31, 2018, the disclosure of which is hereby incorporated by reference in its entirety.

TECHNICAL FIELD

This application relates to the field of optical communications technologies, and in particular, to a link resource transmission method and apparatus.

BACKGROUND

An automatically switched optical network (ASON) floods control routing data, node data, TE link data, and the like of different nodes on an entire network by using an open shortest path first (open shortest path first, OSPF) protocol. All nodes on a network can obtain entire-network data information that has been flooded. Currently, network requirements have grown, and a network needs to expand from original 200 nodes to 3000 nodes, or even more nodes, to meet the requirements. This manner improves the intelligent route computation/route establishment capability of a node, but also limits network expansion. The reason is that a larger network scale means a larger amount of data to be obtained by each node, and therefore the memory and CPU usage of individual nodes become a bottleneck that limits network expansion.

To address network expansion, the OSPF protocol generates a new attribute during protocol development, that is, a not-so-stubby area (NSSA), as shown in FIG. 1. This attribute requires that an ASE route out of an autonomous system (AS) be prevented from entering the NSSA but an ASE route introduced by a router in the NSSA be allowed to transmit in the NSSA and sent out of the area. To meet the foregoing requirement, a link state advertisement (LSA), that is, a type 7 LSA, is defined in the NSSA, and is used when a router in the area introduces an external route. Content of this type of LSA is basically the same as that of a type 5 LSA, except a type identifier. In this way, the router in the area may determine, based on the type of the LSA, whether the route comes from the area. However, because the type 7 LSA is newly defined, it cannot be identified by a router that does not support the NSSA attribute. Therefore, the protocol stipulates that a type 7 LSA generated in an NSSA is to be converted into a type 5 LSA on an area border router (ABR) of the NSSA, then the type 5 LSA is to be published, and an LSA publisher is to be changed to the ABR.

However, a strict limitation is imposed on a networking mode when the NSSA solution is used, and networking and deployment need to be performed according to a fixed pattern. In addition, an ABR node needs to be deployed, and the ABR node is configured to receive network data from an adjacent area. Therefore, a very high requirement is imposed on a CPU and a memory of the ABR node. If the specification of the ABR node remains unchanged, the scale of each adjacent area is limited in turn. It is impossible to require all mature planned networking to be reconstructed based on a stipulated networking specification. In addition, this implementation solution is not convenient for deployment or installation, and a requirement on a memory and a CPU of an ABR node also further affects experience. Therefore, this solution cannot meet a large-network requirement of a controller.

Therefore, a large-network link resource transmission solution urgently needs to be provided, to break through a bottleneck imposed by memory and CPU usage on a large ASON network, to meet a requirement for controlling link resources for ultra-large-scale nodes that continuously grow, and to implement network expansion.

SUMMARY

Embodiments of this application provide a link resource transmission method and apparatus, to break through a bottleneck in memory and CPU usage on a large ASON network, meet a requirement for controlling link resources for ultra-large-scale nodes that continuously grow, and implement network expansion, without increasing networking complexity.

According to a first aspect, a link resource transmission method is provided. In the method, a first node floods first control routing information, where the first control routing information includes an identifier of an area in which the first node is located. The first node receives second control routing information flooded by a second node, where the second control routing information includes an identifier of an area in which the second node is located. The first node determines, through comparison, whether the identifier of the area in which the first node is located is consistent with the identifier of the area in which the second node is located. When the identifier of the area in which the first node is located is consistent with the identifier of the area in which the second node is located, the first node transmits link data information of the first node to the second node.

In this aspect, no area border router needs to be specially disposed to control transmission of link data information. In this application, each node has a corresponding area identifier. Transmission of link data information in an area may be controlled depending on whether identifiers of areas in which nodes are located are consistent. A networking mode is simple, and a requirement on a memory and a CPU of a node is also decreased.

In a possible implementation, the first node is connected to a controller, and the method further includes: The first node transmits the link data information of the first node to the controller.

In this implementation, the controller may, in a centralized manner, collect link data information of each node in each area, to provide a reference for subsequent service provisioning and the like.

In another possible implementation, the method further includes: The first node receives an area identifier setting instruction from the controller, and obtains the identifier of the area in which the first node is located, where the setting instruction includes the identifier of the area in which the first node is located.

In this implementation, an area identifier of a node is configured by a user by using the controller, and the user may freely configure an area to which the node belongs.

In still another possible implementation, the method further includes: The first node receives an area identifier update instruction from the controller, where the update instruction includes an updated identifier of an area in which the first node is located. The first node suspends transmitting the link data information of the first node to the second node. The first node determines, through comparison, whether the updated identifier of the area in which the first node is located is consistent with the identifier of the area in which the second node is located. When the updated identifier of the area in which the first node is located is consistent with the identifier of the area in which the second node is located, the first node transmits the link data information of the first node to the second node.

In this implementation, the identifier of the area in which the first node is located may be updated. When the identifier is updated, the first node stops transmitting the link data information of the first node to the second node. The reason is that after the identifier of the area in which the first node is located is updated, the first node may be no longer located in a same area as that of the second node, and link data information cannot be transmitted between different areas. The first node may transmit the link data information of the first node to the second node only after determining, through comparison again, that the updated identifier of the area in which the first node is located is consistent with the identifier of the area in which the second node is located, to ensure normal operating of a transmission system.

According to a second aspect, a link resource transmission method is provided. The method includes: A controller receives control routing information sent by a node in one or more areas. The controller creates, based on the area information in the control routing information, a process corresponding to the one or more areas. The controller collects link data information of the one or more areas in the process of the one or more areas. In some embodiments, the controller simultaneously collects link data information of two or more areas.

In this aspect, the controller may, in a centralized manner, and simultaneously collect link data information sent by nodes in a plurality of areas.

In a possible implementation, the method further includes: The controller receives an area division instruction, where the division instruction is used to instruct the controller to obtain a plurality of areas through division, and each area includes one or more nodes. The controller sends a setting instruction to the one or more nodes in each area, where the setting instruction includes an identifier of the area in which the one or more nodes are located.

In another possible implementation, the method further includes: During service provisioning, the controller configures, based on an initial node and a last node for service provisioning and link data information of the one or more nodes, a parameter for the initial node, the last node, and one or more nodes between the initial node and the last node, to create a service transmission channel between the initial node and the last node.

In this implementation, after collecting link data information of a node in each area in a centralized manner, the controller may create a service transmission channel between any two nodes according to a service provisioning request.

According to a third aspect, a link resource transmission method is provided, and is applied to a transmission system. The transmission system includes a first node, a second node, and a controller. The method includes: The first node floods first control routing information, where the first control routing information includes an identifier of an area in which the first node is located. The second node floods second control routing information, where the second control routing information includes an identifier of an area in which the second node is located. The first node determines, through comparison, whether the identifier of the area in which the first node is located is consistent with the identifier of the area in which the second node is located. When the identifier of the area in which the first node is located is consistent with the identifier of the area in which the second node is located, the first node transmits link data information of the first node to the second node.

In a possible implementation, the method further includes: The controller receives an area division instruction, where the division instruction is used to instruct the controller to obtain a plurality of areas through division, and each area includes a plurality of nodes. The controller sends a first setting instruction to the first node, and sends a second setting instruction to the second node, where the first setting instruction includes the identifier of the area in which the first node is located, and the second setting instruction includes the identifier of the area in which the second node is located. The first node receives the first setting instruction from the controller, and obtains the identifier of the area in which the first node is located. The second node receives the second setting instruction from the controller, and obtains the identifier of the area in which the second node is located.

In another possible implementation, the method further includes: The first node receives an area identifier update instruction from the controller, where the update instruction includes an updated identifier of an area in which the first node is located. The first node suspends transmitting the link data information of the first node to the second node. The first node determines, through comparison, whether the updated identifier of the area in which the first node is located is consistent with the identifier of the area in which the second node is located. When the updated identifier of the area in which the first node is located is consistent with the identifier of the area in which the second node is located, the first node transmits the link data information of the first node to the second node.

In still another possible implementation, the first node is located in a first area, the second node is located in a second area, and the method further includes: The controller creates, based on the first control routing information and the second control routing information, a first process corresponding to the first area and a second process corresponding to the second area. The controller collects the link data information of the first node in the first process, and collects the link data information of the second node in the second process. In some embodiments, the controller collects the link data information of the first node and the link data information of the second node simultaneously.

In still another possible implementation, the method further includes: During service provisioning, the controller configures, based on an initial node and a last node for service provisioning and link data information of one or more nodes, a parameter for the initial node, the last node, and the one or more nodes between the initial node and the last node, to create a service transmission channel between the initial node and the last node.

According to a fourth aspect, a link resource transmission apparatus is provided, to implement the link resource transmission method in any one of the first aspect or the possible implementations of the first aspect. The foregoing method may be implemented by software, by hardware, or by hardware by executing corresponding software.

In a possible implementation, a structure of the link resource transmission apparatus includes a processor and a memory. The processor is configured to support the apparatus in performing a corresponding function in the foregoing link resource transmission method. The memory is configured to be coupled to the processor, and the memory stores a program (an instruction) and/or data that are/is necessary for the apparatus. Optionally, the link resource transmission apparatus may further include a communications interface, configured to support link resource transmission between the apparatus and another network element.

In another possible implementation, the link resource transmission apparatus may include a unit module that performs a corresponding action in the foregoing method.

According to a fifth aspect, a link resource transmission apparatus is provided, to implement the link resource transmission method in any one of the second aspect, the third aspect, or the possible implementations of the second aspect and the third aspect. The foregoing method may be implemented by software, by hardware, or by hardware by executing corresponding software.

In a possible implementation, a structure of the link resource transmission apparatus includes a processor and a memory. The processor is configured to support the apparatus in performing a corresponding function in the foregoing link resource transmission method. The memory is configured to be coupled to the processor, and the memory stores a program (an instruction) and data that are necessary for the apparatus. Optionally, the link resource transmission apparatus may further include a communications interface, configured to support link resource transmission between the apparatus and another network element.

In another possible implementation, the link resource transmission apparatus may include a unit module that performs a corresponding action in the foregoing method.

According to a sixth aspect, a link resource transmission system is provided, which includes the foregoing link resource transmission apparatus.

According to a seventh aspect, a link resource transmission system is provided. The system includes a first node, a second node, and a controller. The first node floods first control routing information, where the first control routing information includes an identifier of an area in which the first node is located. The second node floods second control routing information, where the second control routing information includes an identifier of an area in which the second node is located. The first node determines, through comparison, whether the identifier of the area in which the first node is located is consistent with the identifier of the area in which the second node is located. When the identifier of the area in which the first node is located is consistent with the identifier of the area in which the second node is located, the first node further transmits link data information of the first node to the second node.

In a possible implementation, the controller receives an area division instruction, where the division instruction instructs the controller to obtain a first area and a second area through division, the first area includes one or more first nodes, and the second area includes one or more second nodes. The controller further sends a first setting instruction to the first node, and sends a second setting instruction to the second node, where the first setting instruction includes the identifier of the area in which the first node is located, and the second setting instruction includes the identifier of the area in which the second node is located. The first node further receives the first setting instruction from the controller, and obtains the identifier of the area in which the first node is located. The second node further receives the second setting instruction from the controller, and obtains the identifier of the area in which the second node is located.

In another possible implementation, the first node receives an area identifier update instruction from the controller, where the update instruction includes an updated identifier of an area in which the first node is located. The first node stops transmitting the link data information of the first node to the second node. The first node further determines, through comparison, whether the updated identifier of the area in which the first node is located is consistent with the identifier of the area in which the second node is located. When the updated identifier of the area in which the first node is located is consistent with the identifier of the area in which the second node is located, the first node further transmits the link data information of the first node to the second node.

In still another possible implementation, the first node is located in the first area, and the second node is located in the second area. The controller creates, based on the first control routing information and the second control routing information, a first process corresponding to the first area and a second process corresponding to the second area. The controller further collects the link data information of the first node in the first process, and collects the link data information of the second node in the second process. In some embodiments, the controller collects link data information of the two nodes simultaneously.

In still another possible implementation, during service provisioning, the controller further configures, based on an initial node and a last node for service provisioning and link data information of one or more nodes, a parameter for the initial node, the last node, and the one or more nodes between the initial node and the last node, to create a service transmission channel between the initial node and the last node.

According to an eighth aspect, a computer-readable storage medium is provided. The computer-readable storage medium stores a computer program or an instruction. When the computer program or the instruction is executed, the methods in the foregoing aspects are implemented.

According to a ninth aspect, a computer program product including an instruction is provided. When the instruction runs on a computer, the computer is enabled to perform the methods in the foregoing aspects.

DESCRIPTION OF EMBODIMENTS

Figure 1:
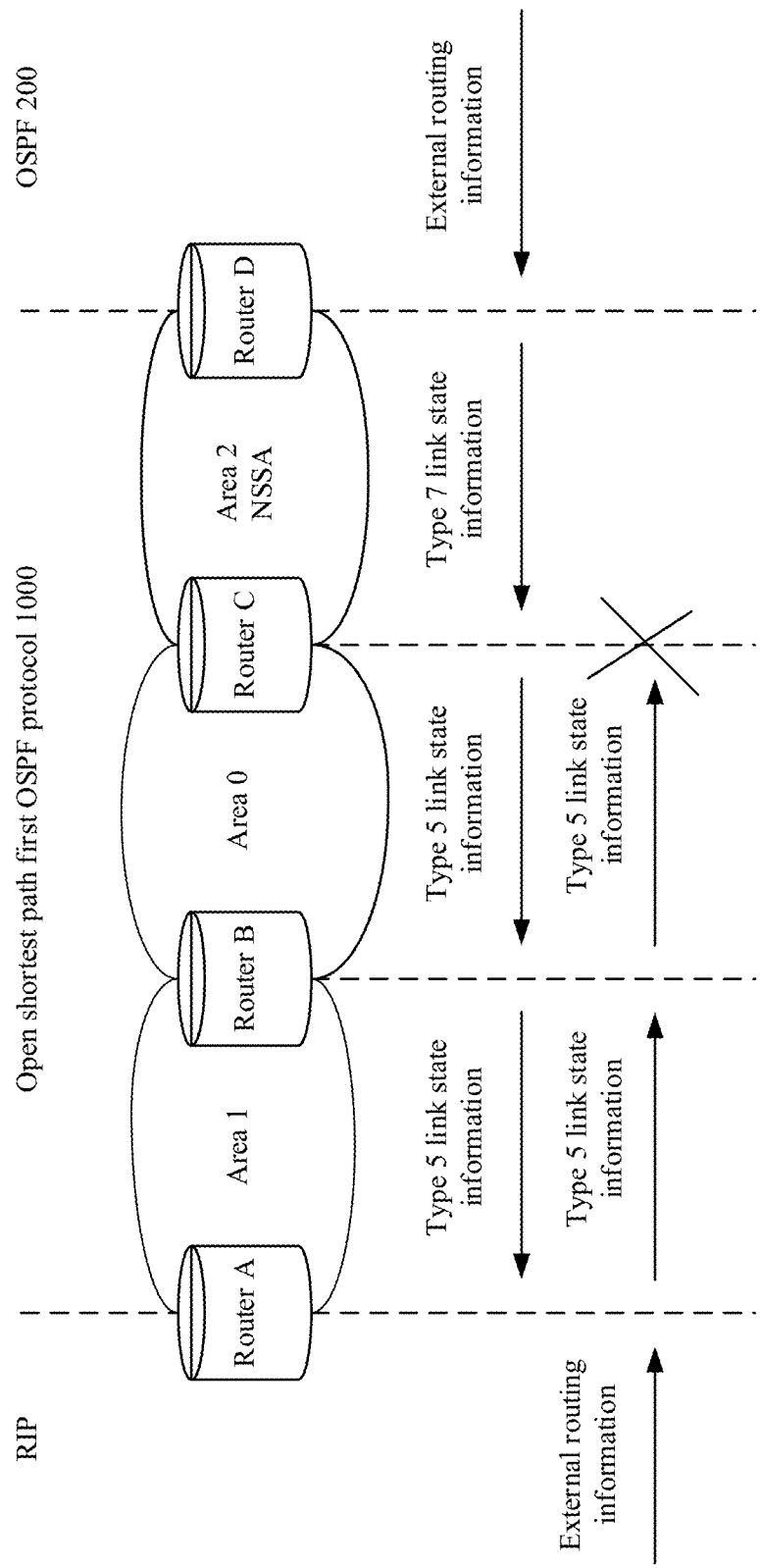
FIG. 1 is a schematic diagram of transmitting link data information in an NSSA.

The following describes several concepts in this application.

OSPF

The OSPF is an interior gateway protocol (IGP). It is used for routing decision in a single autonomous system (AS), and is an implementation of a link-state routing protocol.

A link is another term for a router interface. Therefore, the OSPF is also referred to as an interface-state routing protocol. The OSPF advertises a network interface state between routers to establish a link-state database and generate a shortest-path tree. Each OSPF router uses these shortest paths to construct a routing table.

The OSPF routing protocol is a typical link-state routing protocol, and is usually used within one routing area. Herein, the routing area is an autonomous system, and includes a set of networks that exchange routing information by using a uniform routing policy or routing protocol. In the AS, all OSPF routers maintain a same database that describes a structure of the AS. The database stores state information of a corresponding link in the routing area. An OSPF router uses this database to calculate an OSPF routing table of the OSPF router.

As a link-state routing protocol, the OSPF transmits a link state advertisement (LSA) to all routers in an area.

LSA

The LSA is description information of an OSPF interface, for example, an IP address, a subnet mask, a network type, or a cost value of the interface. OSPF routers exchange link states (LSAs) instead of routing tables. The OSPF obtains all link state information on a network, to calculate an accurate network path to reach each target. An OSPF router sends all link states of the OSPF router to a neighbor. The neighbor places all received link states in a link-state database (link-state database). The neighbor then sends the link states to all its neighbors, without any change during transmission. With this process, finally, all OSPF routers on the network have all link states on the network, and link states of all the routers should be able to depict a same network topology.

Automatically Switched Optical Network (ASON)

A basic assumption of the ASON is to introduce a control plane in an optical transport network, to implement on-demand allocation of network resources and further achieve an intelligent optical network. The ASON enables a future optical transport network to develop into a network that provides a connection for any place and any user, become a network including thousands of switching junctions and tens of millions of terminals, and serve as an intelligent fully automatically switched optical network.

The ASON includes three planes: a transmission plane, a control plane, and a management plane. In addition, the ASON further includes a data communications network (DCN) that serves as an auxiliary network.

Control Plane

The control plane includes a set of communications entities, and is responsible for performing a call control and connection control function, and recovering a connection when a failure occurs.

The control plane is like a navigation device, can automatically search for a route, and can further re-calculate a route when an error occurs, to implement protection and recovery. The control plane can collect and spread network topology information, quickly and effectively configure a service connection, and reconfigure or modify a service connection. The control plane supports a plurality of protection and recovery solutions, supports traffic control engineering, is not limited by subnet division for routing areas and transmission resources, and is not limited by a connection control manner.

Management Plane

The management plane performs a function of managing the control plane, the transmission plane, and the data communications network (DCN). The control plane, the transmission plane, and the data communications network (DCN) report their respective management information such as alarms, performance, and events to the management plane. The management plane ensures collaborative work between all planes. The management plane is like a driver who is driving a vehicle. The driver sets a destination for the navigation device, and manages and controls the navigation device and the vehicle during entire driving.

Transmission Plane

The transmission plane performs functions such as optical signal transmission, multiplexing, configuration protection switching, and a cross connection, and ensures reliability of a transmitted optical signal. The transmission plane is like a road, and the optical signal is a vehicle that runs on the road.

DCN

The DCN provides an out-of-band transmission channel for communication within the control plane, the management plane, or the transmission plane and commutation between the three planes, and mainly carries distributed signaling messages related to the control plane and management information related to the transmission plane. The DCN is like a GPS signal transmission channel, and is responsible for transmitting positioning and navigation information.

This application provides a link resource transmission method and apparatus, and no area border router needs to be specially disposed to control transmission of link data information. In this application, each node has a corresponding area identifier. Transmission of link data information in an area may be controlled depending on whether the identifiers of the areas in which nodes are located are consistent. Such networking mode is simple, and the requirement on a memory and a CPU of a node is also decreased.

Figure 2:
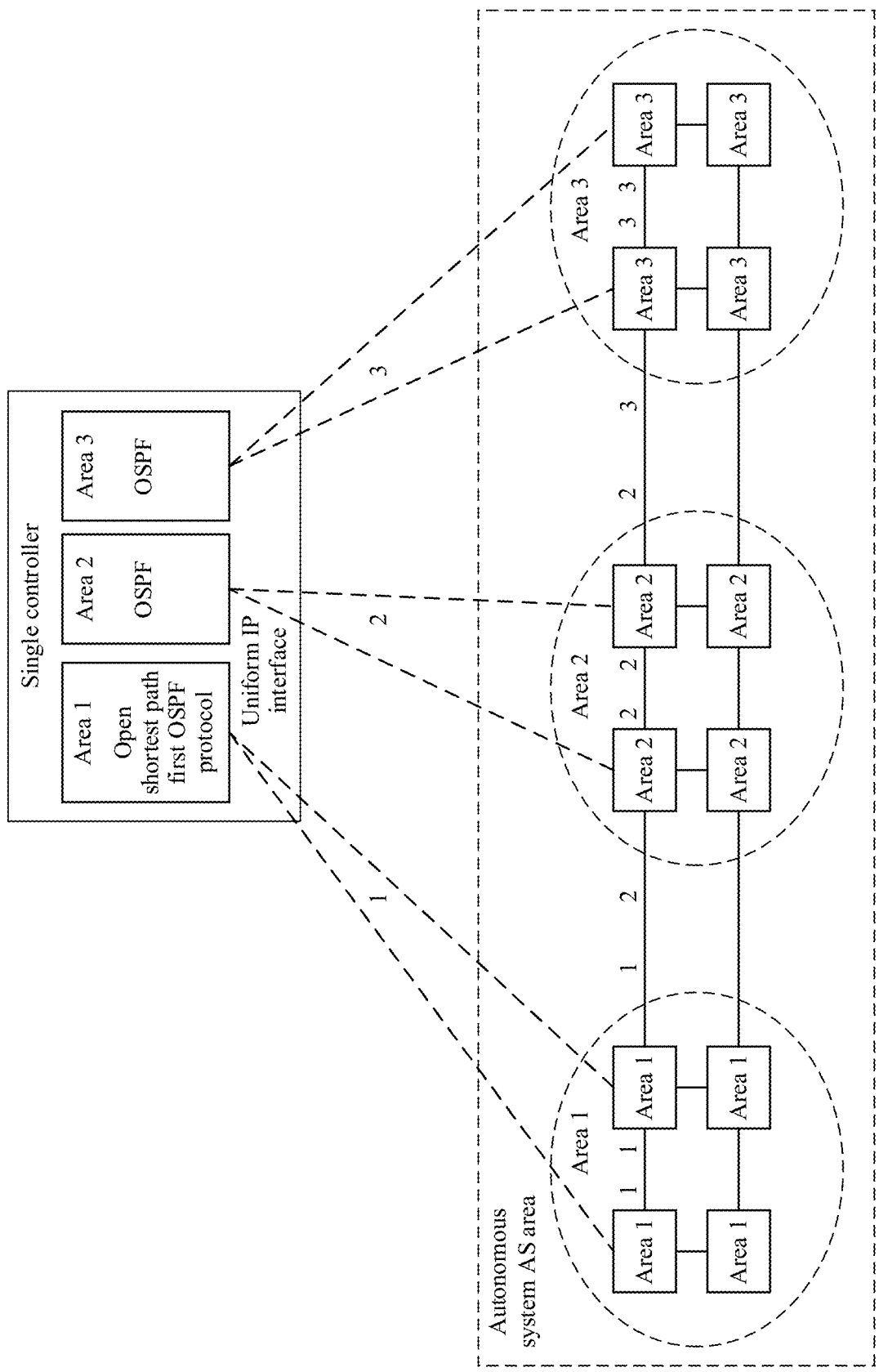
FIG. 2 is a schematic structural diagram of a link resource transmission system according to an embodiment of this application.

FIG. 2 is a schematic structural diagram of a link resource transmission system according to an embodiment of this application. As shown in FIG. 2, the transmission system is a large-network system, and may include a large quantity of nodes, for example, more than 3000 nodes. The transmission system uses OSPF TELINK (link data) area-specific control. Link data is a large-scale data type structure, in the OSPF protocol, that performs intra-area flooding. Specifically, the transmission system includes a controller. A plurality of nodes in the transmission system are distributed to three areas (the figure shows merely an example, and any quantity of areas may be obtained through division in practice): an area 1, an area 2, and an area 3. Each area includes one or more nodes. A node may also be referred to as an ASON device. Nodes in each area may be connected by using an optical fiber or a network cable. Nodes across areas may also be connected by using an optical fiber or a network cable. The three areas jointly serve as an AS area. The controller controls the entire AS area in a centralized manner. A plurality of area processes are created in the controller. In a process corresponding to each area, the controller communicates with each node in the area by using the OSPF protocol or the like.

Figure 3:
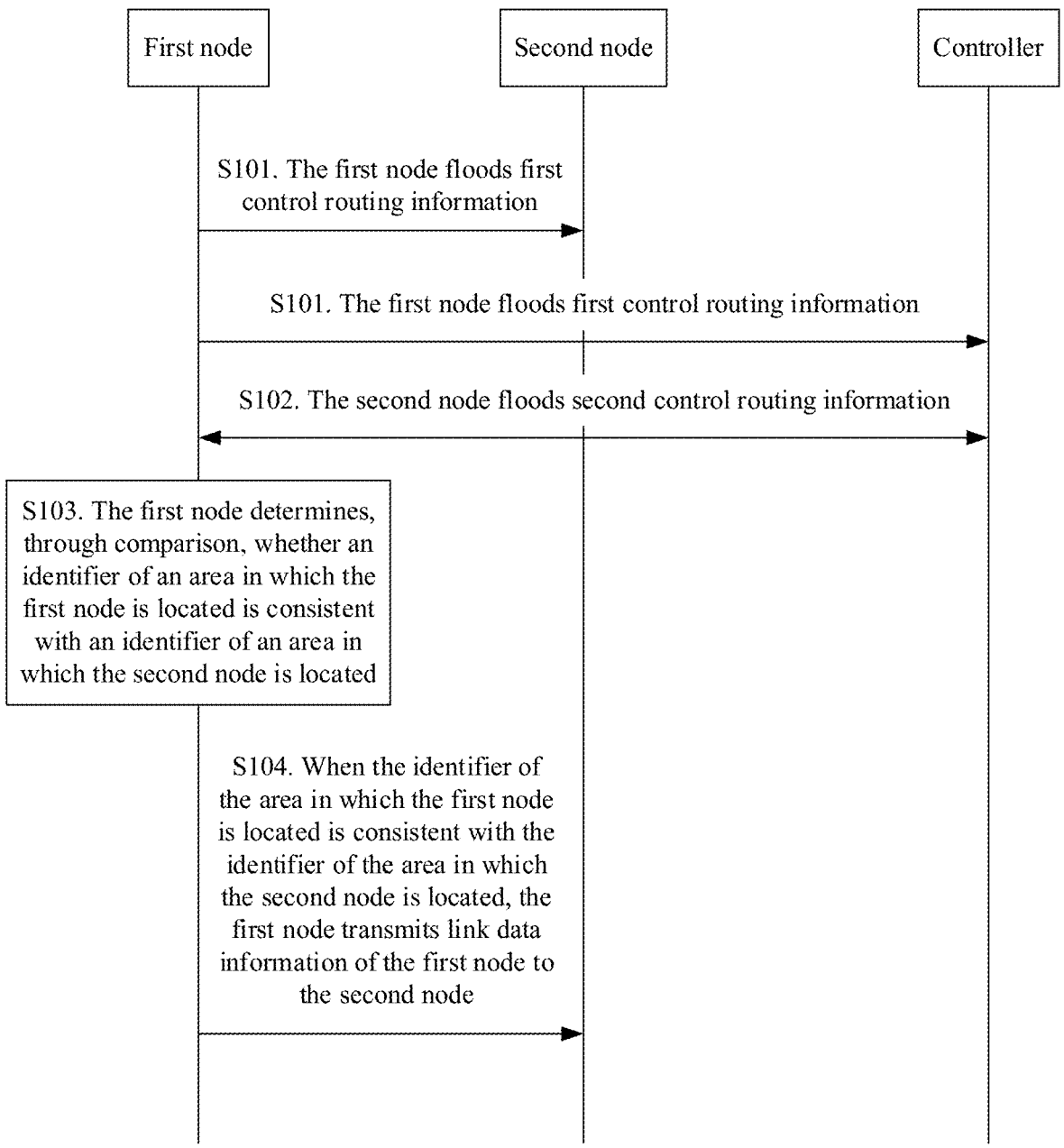
FIG. 3 is a schematic flowchart of a link resource transmission method according to an embodiment of this application.

FIG. 3 is a schematic flowchart of a link resource transmission method according to an embodiment of this application. The method includes the following steps.

S101. A first node floods first control routing information, where the first control routing information includes an identifier of an area in which the first node is located.

Correspondingly, a node or a controller in the area in which the first node is located or in another area receives the first control routing information.

The first node, or referred to as an ASON device, supports setting of an identifier (area id) of an area in which the first node is located. After network planning, the controller sets different area IDs on nodes, to distribute the nodes to different AS areas. As shown in FIG. 2, an area 1, an area 2, and an area 3 are obtained through division.

After the area ID is set on the first node, the node floods only the first control routing information, but does not transmit link data information of the first node. In this application, link data information can be transmitted only between nodes in a same area, and only control routing information can be transmitted between nodes in different areas. For example, when OSPF of the first node receives a creation or update IPS message sent by a LIM module, if a PPP link is involved, the OSPF needs to modify enable_te_flooding into false (that is, by default, link data information is not flooded). The first control routing information includes the identifier of the area in which the node is located. The first control routing information may be a type of LSA, for example, a type 9 LSA. When the LIM module activates an interface by using a MIB message, the OSPF sends a type 9 LSA. The link data information may be the foregoing TELINK S102. A second node floods second control routing information, where the second control routing information includes an identifier of an area in which the second node is located.

Correspondingly, a node or a controller in the area in which the second node is located or in another area receives the second control routing information.

Likewise, after an area ID is set on the second node, the node floods only the second control routing information, but does not transmit link data information of the second node. The second control routing information includes the identifier of the area in which the second node is located.

S103. The first node determines, through comparison, whether the identifier of the area in which the first node is located is consistent with the identifier of the area in which the second node is located.

After receiving the second control routing information (for example, a type 9 LSA) of the second node, the first node parses the area ID, in the second control routing information, of the area in which the second node is located, and determines, through comparison, whether the identifier of the area in which the first node is located is consistent with the identifier of the area in which the second node is located.

S104. When the identifier of the area in which the first node is located is consistent with the identifier of the area in which the second node is located, the first node transmits the link data information of the first node to the second node.

If the identifier of the area in which the first node is located is consistent with the identifier of the area in which the second node is located, it indicates that the first node and the second node are located in a same area. In this case, the first node may transmit the link data information of the first node to the second node. For example, the first node modifies enable_te_flooding into true, and floods all TELINK information of the first node to the second node. The link data information includes a link state and attribute information. The link state includes link connectivity state information and the like. The attribute information includes information about bandwidth, a remote end, a subrack, a board slot, a port, and the like.

If the identifier of the area in which the first node is located is inconsistent with the identifier of the area in which the second node is located, only control routing information (an LSA) is flooded.

Through flooding and identification of area IDs, TE links of different areas are isolated, and control routing is not limited. Therefore, through control, TE link information is not transmitted between different areas, but TE link information can be transmitted within a same area.

For mature planned networking of customers, it is impossible to require all customers to perform reconstruction based on a stipulated networking specification. In addition, this implementation is not convenient for deployment or installation of customers. Furthermore, a requirement on a memory and a CPU of an ABR also further affects customer experience.

However, the solution of OSPF TELINK area-specific control and entire-network flooding of control routing information in this application has the following differences from an NSSA:

(1) No ABR node needs to be selected. This minimizes a dependency on a memory and a CPU of an ABR node, and ensures, as far as possible, a maximum specification of 400 nodes for a single area.

(2) For a legacy network of a customer, large-scale network adjustment is not required, thereby improving overall network scalability.

(3) A control topology is reachable on an entire network, thereby ensuring a capability of end-to-end service creation.

According to the link resource transmission method provided in this embodiment of this application, no area border router needs to be specially disposed to control transmission of link data information. In this application, each node has a corresponding area identifier. Transmission of link data information in an area may be controlled depending on whether the identifiers of the areas in which nodes are located are consistent. Such networking mode is simple, and the requirement on a memory and a CPU of a node is also decreased.

Figure 4A:
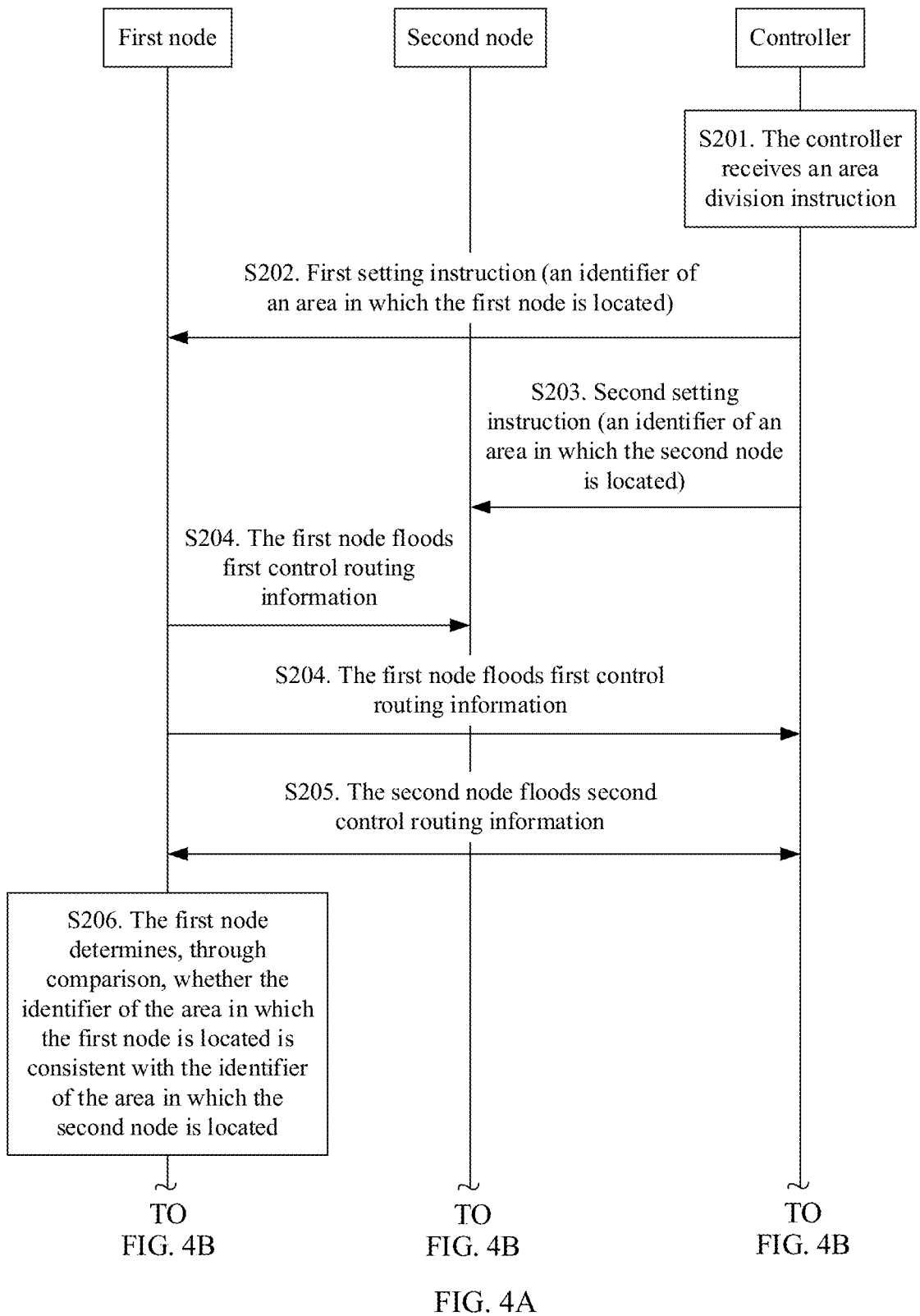
FIG. 4A to FIG. 4C are a schematic flowchart of another link resource transmission method according to an embodiment of this application.
Figure 4B:
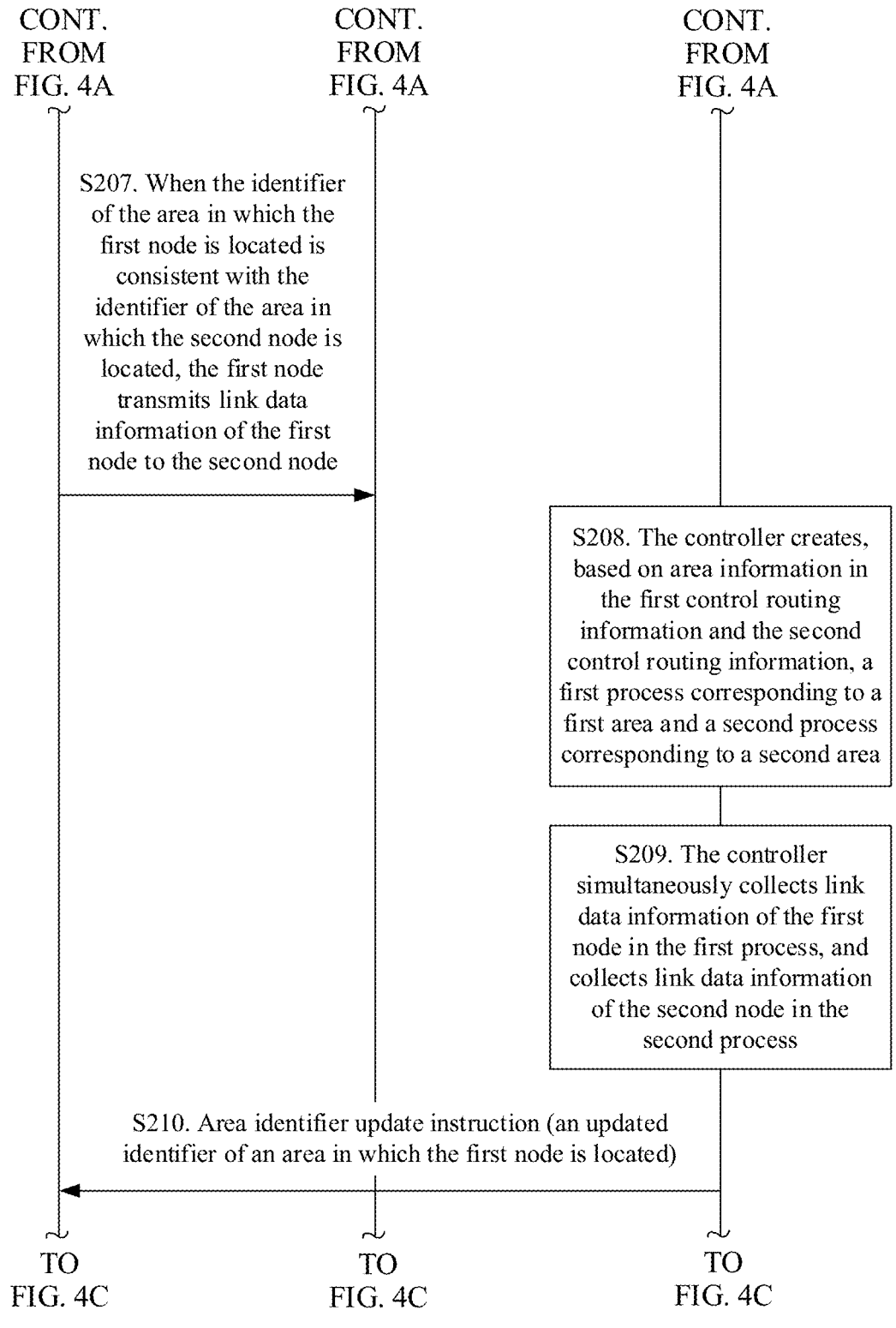
Figure 4C:
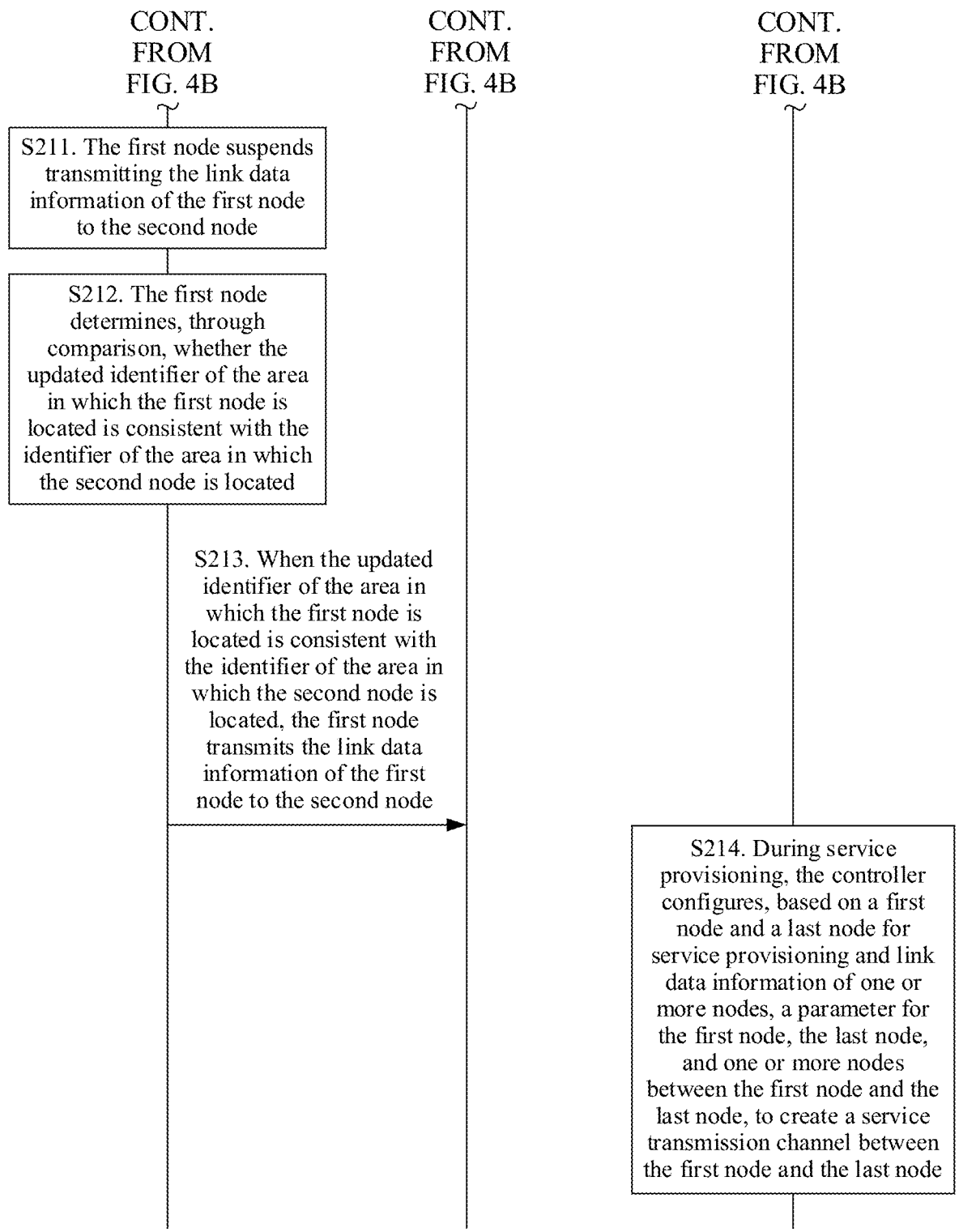

FIG. 4A to FIG. 4C are a schematic flowchart of another link resource transmission method according to an embodiment of this application. The method includes the following steps.

S201. A controller receives an area division instruction, where the division instruction is used to instruct the controller to obtain a plurality of areas through division, and each area includes a plurality of nodes.

A user may divide a network into a plurality of areas by using the controller, and each area includes one or more nodes. The controller receives an area division instruction from the user. In an example of this embodiment, the network may be divided into a plurality of areas, and the quantity of areas into which the network is divided is not limited.

S202. The controller sends a first setting instruction to a first node, where the first setting instruction includes an identifier of an area in which the first node is located.

Correspondingly, the first node receives the first setting instruction from the controller, and obtains the identifier of the area in which the first node is located.

After dividing the network into a plurality of areas, the controller sends, to a node in each area, a setting instruction for an identifier of an area in which the node is located. In this step, the controller sends the first setting instruction to the first node, where the first setting instruction includes the identifier of the area in which the first node is located.

S203. The controller sends a second setting instruction to a second node, where the second setting instruction includes an identifier of an area in which the second node is located.

Correspondingly, the second node receives the second setting instruction from the controller, and obtains the identifier of the area in which the second node is located.

Likewise, the controller sends the second setting instruction to the second node, where the second setting instruction includes the identifier of the area in which the second node is located.

The identifier of the area in which the first node is located and the identifier of the area in which the second node is located may be the same or different.

S204. The first node floods first control routing information, where the first control routing information includes the identifier of the area in which the first node is located.

S205. The second node floods second control routing information, where the second control routing information includes the identifier of the area in which the second node is located.

S206. The first node determines, through comparison, whether the identifier of the area in which the first node is located is consistent with the identifier of the area in which the second node is located.

S207. When the identifier of the area in which the first node is located is consistent with the identifier of the area in which the second node is located, the first node transmits link data information of the first node to the second node.

For a specific implementation process of S204 to S207, refer to steps S101 to S104 in the embodiment shown in FIG. 3. Details are not described herein.

S208. The controller creates, based on area information in the first control routing information and the second control routing information, a first process corresponding to a first area and a second process corresponding to a second area.

Each node in an area may transmit various types of control routing information to the controller. The controller uniformly collects various types of control routing information sent by nodes in each area. The various types of control routing information include a type 9 LSA, that is, an identifier of an area in which a node is located. The network is divided into a plurality of areas. Because the controller obtains an identifier of an area in which each node is located, the controller may learn of the area in which each node is located. The controller may create, based on the area information (the identifier of the area in which the first node is located and the identifier of the area in which the second node is located) in the first control routing information and the second control routing information, the first process corresponding to the first area and the second process corresponding to the second area. As shown in FIG. 2, the controller creates, in the controller, processes or instances corresponding to an area 1, an area 2, and an area 3. The process collects link data information of a node in each area from the node in the area. A plurality of created processes may be executed simultaneously.

S209. The controller collects the link data information of the first node in the first process, and collects link data information of the second node in the second process. In one embodiment, the controller simultaneously collects the link data information in both processes.

After creating, in the controller, the processes or the instances corresponding to the area 1, the area 2, and the area 3, the controller may simultaneously execute the three processes, that is, simultaneously collect link data information of nodes in the area 1, the area 2, and the area 3 from the nodes. This greatly improves efficiency for obtaining link data information.

Figure 5:
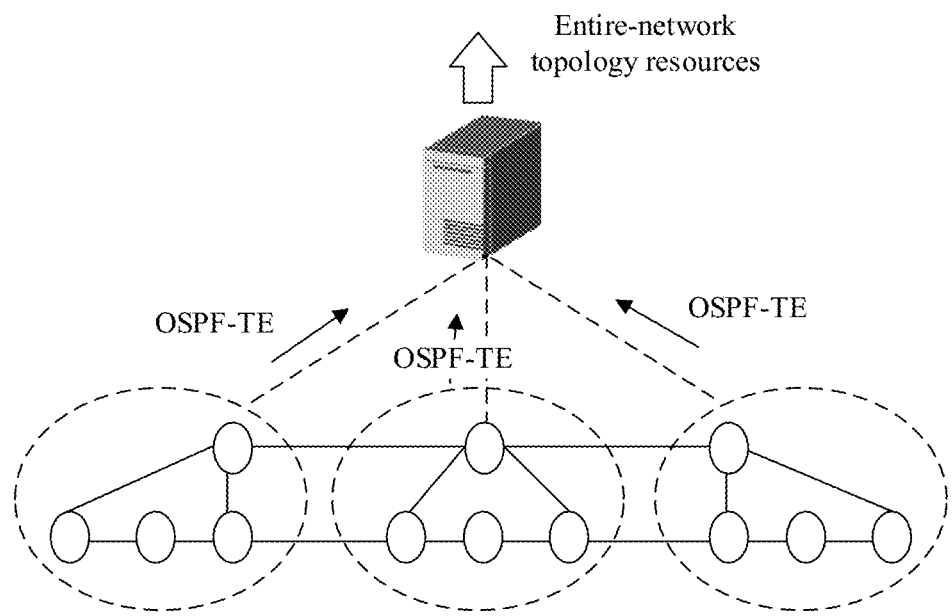
FIG. 5 is a schematic diagram of transmitting a link resource/topology resource according to an embodiment of this application.

FIG. 5 is a schematic diagram of transmitting a link resource/topology resource according to an embodiment of this application. As shown in FIG. 5, nodes in a plurality of areas separately transmit link data information, that is, OSPF-TE shown in the figure, to the controller by using the OSPF protocol, so that the controller can obtain entire-network link resources, also referred to as topology resources.

S210. The controller sends an area identifier update instruction to the first node, where the update instruction includes an updated identifier of an area in which the first node is located.

Correspondingly, the first node receives the area identifier update instruction from the controller.

An area may be obtained through manual division. Therefore, an identifier of an area in which a node is located may be changed. For example, the controller needs to update the identifier of the area in which the first node is located. In this case, the controller sends the area identifier update instruction to the first node, where the update instruction includes the updated identifier of the area in which the first node is located. The first node receives the update instruction, and obtains the updated identifier of the area in which the first node is located.

S211. The first node suspends transmitting the link data information of the first node to the second node.

Before the area ID of the first node is updated, the area ID of the first node may be the same as the area ID of the second node. In this case, the first node may transmit the link data information of the first node to the second node. Optionally, the first node periodically transmits link data information of the first node to the second node. Because the area ID is updated, the area in which the first node is located may be different from the area in which the second node is located, that is, the area ID of the first node may be different from the area ID of the second node. When detecting that the area ID of the first node is updated, the first node suspends transmitting the link data information of the first node to the second node.

S212. The first node determines, through comparison, whether the updated identifier of the area in which the first node is located is consistent with the identifier of the area in which the second node is located.

After detecting that the area ID of the first node is updated, the first node performs a same procedure as that in S206 to determine, through comparison, whether the updated identifier of the area in which the first node is located is consistent with the identifier of the area in which the second node is located.

S213. When the updated identifier of the area in which the first node is located is consistent with the identifier of the area in which the second node is located, the first node transmits the link data information of the first node to the second node.

An implementation of S213 is the same as that of S207. Details are not described herein again.

S214. During service provisioning, the controller configures, based on an initial node and a last node for service provisioning and link data information of one or more nodes, a parameter for the initial node, the last node, and the one or more nodes between the initial node and the last node, to create a service transmission channel between the initial node and the last node.

Figure 6:
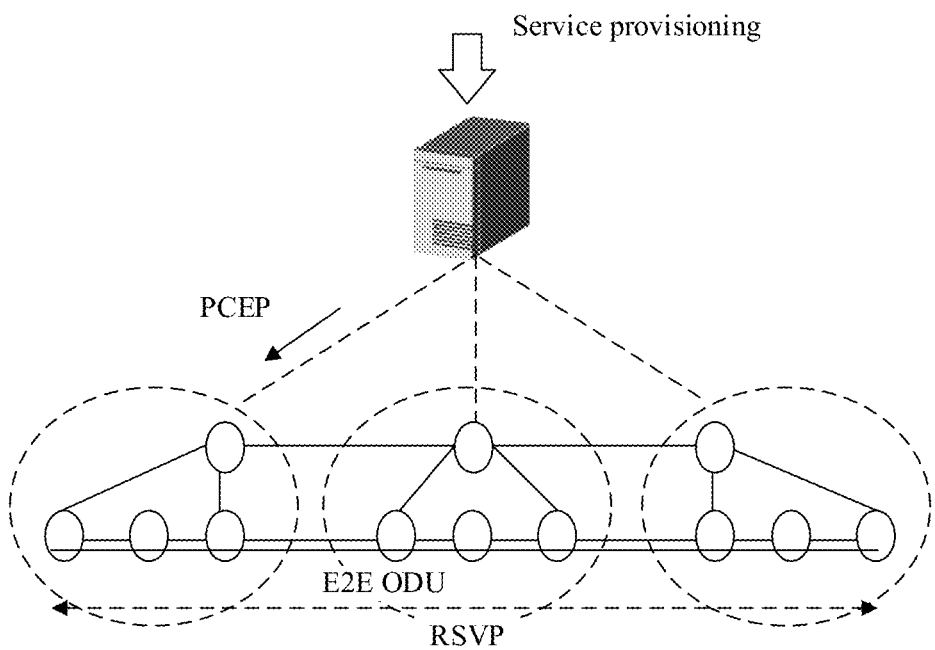
FIG. 6 is a schematic diagram of service provisioning according to an embodiment of this application.

This application supports a cross-area E2E (end-to-end) channel. FIG. 6 is a schematic diagram of service provisioning according to an embodiment of this application. When a user requires an ASON channel to be created between an initial node and a last node, the controller calculates an LSP path in an end-to-end manner, and delivers the LSP path to the initial node of a service. The initial node of the service is responsible for end-to-end service configuration, preset path rerouting, and intra-area rerouting, and is also responsible for reporting a service status to the controller. As shown in FIG. 6, a service is provisioned to the controller, and the controller delivers an LSP path to a node (an initial node) in an area by using the PCEP protocol, to create an E2E ODU that can cross a plurality of areas, and transmit an RSVP service.

According to the link resource transmission method provided in this embodiment of this application, no area border router needs to be specially disposed to control transmission of link data information. In this application, each node has a corresponding area identifier. Transmission of link data information in an area may be controlled depending on whether the identifiers of the areas in which nodes are located are consistent. Such networking mode is simple, and the requirement on a memory and a CPU of a node is also decreased. After uniformly collecting link data information of a node in each area in a centralized manner, the controller may create a service transmission channel between any two nodes according to a service provisioning requirement.

The foregoing describes in detail the method in the embodiments of this application. The following provides an apparatus in the embodiments of this application.

Figure 7:
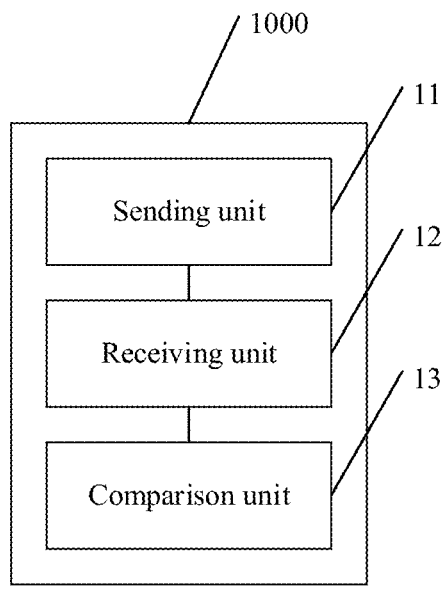
FIG. 7 is a schematic structural diagram of a link resource transmission apparatus according to an embodiment of this application.

Based on a same concept as that of the link resource transmission method in the foregoing embodiments, as shown in FIG. 7, an embodiment of this application further provides a link resource transmission apparatus 1000. The link resource transmission apparatus may be applied to the link resource transmission method shown in FIG. 3 and FIG. 4A to FIG. 4C. The link resource transmission apparatus 1000 includes a sending unit 11, a receiving unit 12, and a comparison unit 13.

The sending unit 11 is configured to flood first control routing information, where the first control routing information includes an identifier of an area in which a first node is located.

The receiving unit 12 is configured to receive second control routing information flooded by a second node, where the second control routing information includes an identifier of an area in which the second node is located.

The comparison unit 13 is configured to determine, through comparison, whether the identifier of the area in which the first node is located is consistent with the identifier of the area in which the second node is located.

The sending unit 11 is further configured to: when the identifier of the area in which the first node is located is consistent with the identifier of the area in which the second node is located, transmit link data information of the first node to the second node.

In an implementation, the first node is connected to a controller, and the sending unit 11 is further configured to transmit the link data information of the first node to the controller.

In another implementation, the receiving unit 12 is further configured to receive an area identifier setting instruction from the controller, and obtain the identifier of the area in which the first node is located, where the setting instruction includes the identifier of the area in which the first node is located.

More detailed descriptions of the sending unit 11, the receiving unit 12, and the comparison unit 13 may be directly obtained by directly referring to related descriptions of the first node in the method embodiments shown in FIG. 3 and FIG. 4A to FIG. 4C. Details are not described herein.

Figure 8:
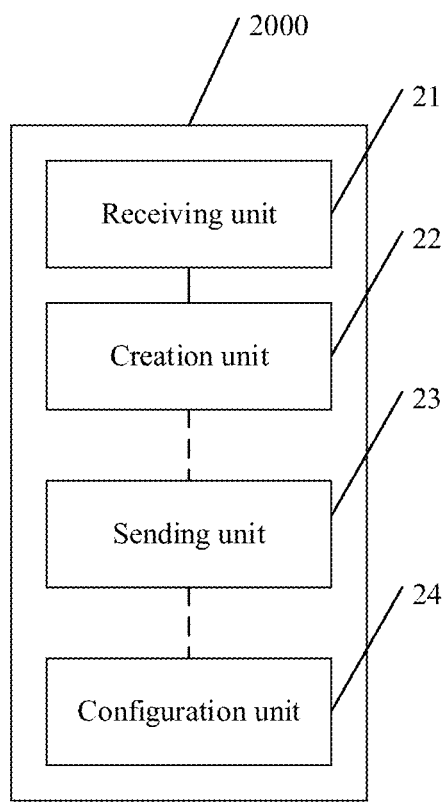
FIG. 8 is a schematic structural diagram of another link resource transmission apparatus according to an embodiment of this application.

Based on a same concept as that of the link resource transmission method in the foregoing embodiments, as shown in FIG. 8, an embodiment of this application further provides a link resource transmission apparatus 2000. The link resource transmission apparatus may be applied to the link resource transmission method shown in FIG. 3 and FIG. 4A to FIG. 4C. The link resource transmission apparatus 2000 includes a receiving unit 21 and a creation unit 22, and may further include a sending unit 23 and a configuration unit 24.

The receiving unit 21 is configured to receive control routing information sent by a node in one or more areas.

The creation unit 22 is configured to create, based on the control routing information, a process corresponding to the one or more areas.

The receiving unit 21 is further configured to collect link data information of the one or more areas in the process of the one or more areas. In some embodiments, the receiving unit 21 may simultaneously collect link data information of the one or more areas.

In an implementation, the receiving unit 21 is further configured to receive an area division instruction, where the division instruction is an instruction for obtaining a plurality of areas through division, and each area includes one or more nodes.

The sending unit 23 is further configured to send a setting instruction to the one or more nodes in each area, where the setting instruction includes an identifier of the area in which the one or more nodes are located.

In another implementation, the configuration unit 24 is configured to: during service provisioning, perform parameter configuration for an initial node, a last node, and one or more nodes between the initial node and the last node, based on the initial node and the last node for service provisioning and link data information of the one or more nodes, to create a service transmission channel between the initial node and the last node.

More detailed descriptions of the receiving unit 21, the creation unit 22, the sending unit 23, and the configuration unit 24 may be directly obtained by directly referring to related descriptions of the controller in the method embodiments shown in FIG. 3 and FIG. 4A to FIG. 4C. Details are not described herein.

Figure 9:
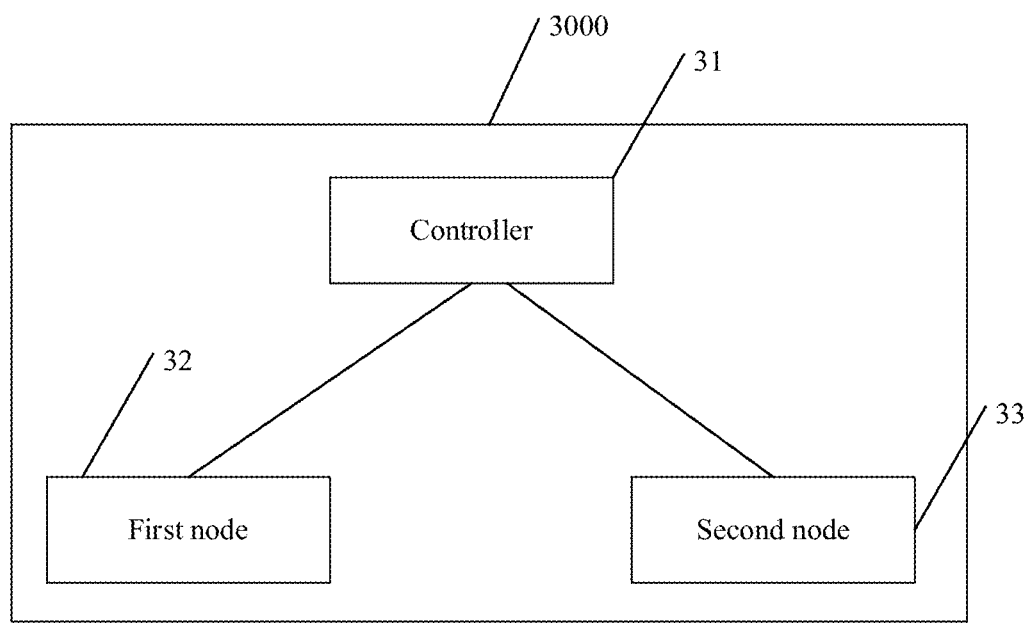
FIG. 9 is a schematic structural diagram of still another link resource transmission apparatus according to an embodiment of this application.

Based on a same concept as that of the link resource transmission method in the foregoing embodiments, as shown in FIG. 9, an embodiment of this application further provides a link resource transmission system. The link resource transmission system may be applied to the link resource transmission method shown in FIG. 3 and FIG. 4A to FIG. 4C. The transmission system 3000 includes a controller 31, a first node 32, and a second node 33. Certainly, the transmission system may alternatively include more nodes. Herein merely shows an example. The controller is separately connected to the first node 32 and the second node 33.

The first node 32 floods first control routing information, where the first control routing information includes an identifier of an area in which the first node 32 is located.

The second node 33 floods second control routing information, where the second control routing information includes an identifier of an area in which the second node 33 is located.

The first node 32 determines, through comparison, whether the identifier of the area in which the first node 32 is located is consistent with the identifier of the area in which the second node 33 is located.

When the identifier of the area in which the first node 32 is located is consistent with the identifier of the area in which the second node 33 is located, the first node 32 transmits link data information of the first node 32 to the second node 33.

In an implementation, the controller 31 receives an area division instruction, where the division instruction is an instruction for obtaining a plurality of areas through division, and each area includes one or more nodes.

The controller 31 sends a first setting instruction to the first node 32, and sends a second setting instruction to the second node 33, where the first setting instruction includes the identifier of the area in which the first node 32 is located, and the second setting instruction includes the identifier of the area in which the second node 33 is located.

The first node 32 receives the first setting instruction from the controller 31, and obtains the identifier of the area in which the first node 32 is located.

The second node 33 receives the second setting instruction from the controller 31, and obtains the identifier of the area in which the second node 33 is located.

In another implementation, the first node 32 receives an area identifier update instruction from the controller 31, where the update instruction includes an updated identifier of an area in which the first node 32 is located.

The first node 32 suspends transmitting the link data information of the first node 32 to the second node 33.

The first node 32 determines, through comparison, whether the updated identifier of the area in which the first node 32 is located is consistent with the identifier of the area in which the second node 33 is located.

When the updated identifier of the area in which the first node 32 is located is consistent with the identifier of the area in which the second node 33 is located, the first node 32 transmits the link data information of the first node 32 to the second node 33.

In still another implementation, the first node 32 is located in a first area, and the second node 33 is located in a second area.

The controller 31 creates, based on the first control routing information and the second control routing information, a first process corresponding to the first area and a second process corresponding to the second area.

The controller 31 collects the link data information of the first node 32 in the first process, and collects link data information of the second node 33 in the second process. In some embodiments, the controller 31 collects the link data information of the first and second node simultaneously.

In still another implementation, during service provisioning, the controller 31 configures, based on an initial node and a last node for service provisioning and link data information of the one or more nodes, a parameter for the initial node, the last node, and one or more nodes between the initial node and the last node, to create a service transmission channel between the initial node and the last node.

Figure 10:
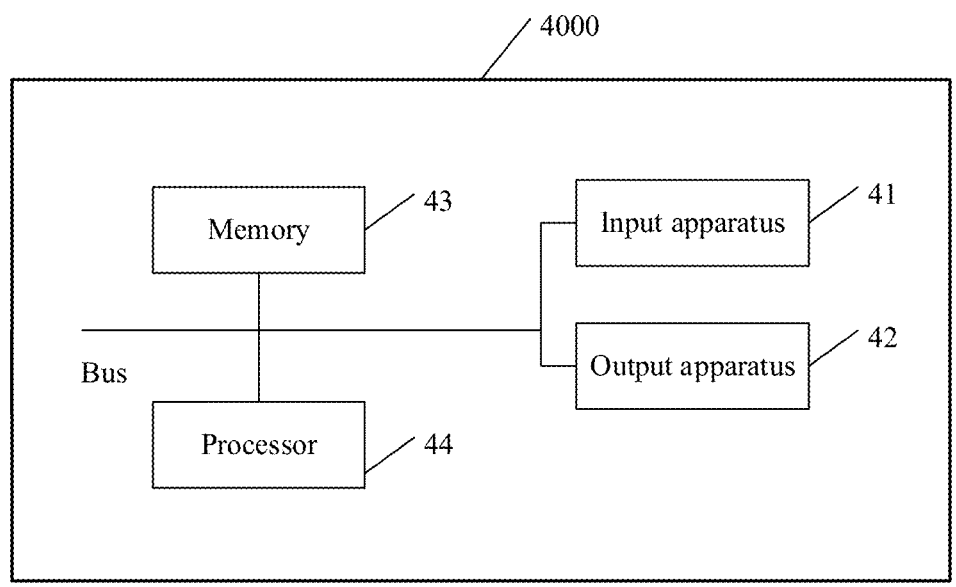
FIG. 10 is a schematic structural diagram of still another link resource transmission apparatus according to an embodiment of this application.

An embodiment of this application further provides a link resource transmission apparatus. The link resource transmission apparatus is configured to perform the foregoing link resource transmission method. FIG. 10 is a schematic structural diagram of still another link resource transmission apparatus according to an embodiment of this application. As shown in FIG. 10, the apparatus may include:

an input apparatus 41, an output apparatus 42, a memory 43, and a processor 44 (there may be one or more processors in the apparatus, and one processor is shown in FIG. 10 as an example). In some embodiments of this application, the input apparatus 41, the output apparatus 42, the memory 43, and the processor 44 may be connected by using a bus or in another manner. FIG. 10 shows an example in which a bus is used for connection.

The processor 44 may be a central processing unit (CPU), a network processor (NP), or a combination of a CPU and an NP.

The processor 44 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 43 may include a volatile memory (volatile memory) such as a random access memory (RAM); or the memory may include a non-volatile memory such as a flash memory, a hard disk drive (HDD), or a solid-state drive (SSD); or the memory may include a combination of the foregoing types of memories.

The foregoing link resource transmission method may be partially or completely implemented by hardware or software.

Optionally, the link resource transmission apparatus may be a chip or an integrated circuit in a specific implementation.

Optionally, when the link resource transmission method in the foregoing embodiments is partially or completely implemented by software, the link resource transmission apparatus includes: a memory, configured to store a program; and a processor, configured to execute the program stored in the memory. When the program is executed, the link resource transmission apparatus is enabled to implement the link resource transmission method provided in the foregoing embodiments.

Optionally, the memory may be a physically independent unit, or may be integrated with a processor.

Optionally, when the link resource transmission method in the foregoing embodiments is partially or completely implemented by software, the link resource transmission apparatus may alternatively include only a processor. For example, in one embodiment, a memory configured to store a program is located outside the link resource transmission apparatus. The processor is connected to the memory by using a circuit or a wire, to read and execute the program stored in the memory. In other embodiments, the memory configured to store the program can be located inside the link resource transmission apparatus.

This application further provides a computer program product, configured to perform the method in FIG. 3 or FIG. 4A to FIG. 4C when being executed on a computing device.

This application further provides a computer-readable storage medium. The computer-readable storage medium stores a computer program. When the program is executed by a processor, the method in FIG. 3 or FIG. 4 A to FIG. 4C is implemented.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer-readable storage medium or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a read-only memory (ROM), a random access memory, a magnetic medium such as a floppy disk, a hard disk, a magnetic tape, or a magnetic disc, an optical medium such as a digital versatile disc (DVD), a semiconductor medium such as a solid-state drive, or the like.

What is claimed is:

1. A link resource transmission method, comprising:
    flooding, by a first node connected to a controller, first control routing information, wherein the first control routing information comprises an identifier of an area in which the first node is located;
    receiving, by the first node, second control routing information flooded by a second node, wherein the second control routing information comprises an identifier of an area in which the second node is located;
    determining, by the first node through comparison, whether the identifier of the area in which the first node is located is consistent with the identifier of the area in which the second node is located;
    when the identifier of the area in which the first node is located is consistent with the identifier of the area in which the second node is located, transmitting, by the first node, link data information of the first node to the second node;
    transmitting, by the first node, the link data information of the first node to the controller;
    receiving, by the first node, an area identifier update instruction from the controller, wherein the area identifier update instruction comprises an updated identifier of an area in which the first node is located;
    suspending, by the first node, transmitting the link data information of the first node to the second node;
    determining, by the first node through comparison, whether the updated identifier of the area in which the first node is located is consistent with the identifier of the area in which the second node is located; and
    when the updated identifier of the area in which the first node is located is consistent with the identifier of the area in which the second node is located, resuming transmitting, by the first node, the link data information of the first node to the second node.

2. The method according to claim 1, wherein the method further comprises: receiving, by the first node, an area identifier setting instruction from the controller, and obtaining the identifier of the area in which the first node is located, wherein the area identifier setting instruction comprises the identifier of the area in which the first node is located.

3. A link resource transmission method, applied to a transmission system, wherein the transmission system comprises a first node and a second node; and the method comprises:
    flooding, by the first node connected to a controller, first control routing information, wherein the first control routing information comprises an identifier of an area in which the first node is located;
    flooding, by the second node, second control routing information, wherein the second control routing information comprises an identifier of an area in which the second node is located;
    determining, by the first node through comparison, whether the identifier of the area in which the first node is located is consistent with the identifier of the area in which the second node is located;
    when the identifier of the area in which the first node is located is consistent with the identifier of the area in which the second node is located, transmitting, by the first node, link data information of the first node to the second node;
    transmitting, by the first node, the link data information of the first node to the controller;
    receiving, by the first node, an area identifier update instruction from the controller, wherein the area identifier update instruction comprises an updated identifier of an area in which the first node is located;
    suspending, by the first node, transmitting the link data information of the first node to the second node;
    determining, by the first node through comparison, whether the updated identifier of the area in which the first node is located is consistent with the identifier of the area in which the second node is located; and
    when the updated identifier of the area in which the first node is located is consistent with the identifier of the area in which the second node is located, resuming transmitting, by the first node, the link data information of the first node to the second node.

4. The method according to claim 3, wherein the transmission system further comprises a controller, and the method further comprises:

receiving, by the controller, an area division instruction, wherein the area division instruction is used to instruct the controller to obtain a plurality of areas through division, and each area comprises one or more nodes;

sending, by the controller, a first setting instruction to the first node, and sending a second setting instruction to the second node, wherein the first setting instruction comprises the identifier of the area in which the first node is located, and the second setting instruction comprises the identifier of the area in which the second node is located;

receiving, by the first node, the first setting instruction from the controller, and obtaining the identifier of the area in which the first node is located; and receiving, by the second node, the second setting instruction from the controller, and obtaining the identifier of the area in which the second node is located.

5. The method according to claim 3, wherein the first node is located in a first area, the second node is located in a second area, the transmission system further comprises a controller, and the method further comprises:

creating, by the controller based on the first control routing information and the second control routing information, a first process corresponding to the first area and a second process corresponding to the second area; and collecting, by the controller, the link data information of the first node in the first process, and collecting link data information of the second node in the second process.

6. The method according to claim 3, wherein the transmission system further comprises a controller, and the method further comprises:

during service provisioning, configuring, by the controller based on an initial node and a last node for service provisioning and link data information of the one or more nodes, a parameter for the initial node, the last node, and one or more nodes between the initial node and the last node, to create a service transmission channel between the initial node and the last node.

7. A link resource transmission system, wherein the transmission system comprises a first node connected to a controller and a second node, wherein the first node floods first control routing information, wherein the first control routing information comprises an identifier of an area in which the first node is located;

the second node floods second control routing information, wherein the second control routing information comprises an identifier of an area in which the second node is located;

the first node determines, through comparison, whether the identifier of the area in which the first node is located is consistent with the identifier of the area in which the second node is located; and when the identifier of the area in which the first node is located is consistent with the identifier of the area in which the second node is located, the first node transmits link data information of the first node to the second node;

the first node transmits the link data information of the first node to the controller;

the first node receives an area identifier update instruction from the controller, wherein the area identifier update instruction comprises an updated identifier of an area in which the first node is located;

the first node suspends transmitting the link data information of the first node to the second node;

the first node determines, through comparison, whether the updated identifier of the area in which the first node is located is consistent with the identifier of the area in which the second node is located; and when the updated identifier of the area in which the first node is located is consistent with the identifier of the area in which the second node is located, the first node transmits the link data information of the first node to the second node.

8. The system according to claim 7, wherein the transmission system further comprises a controller, and the controller receives an area division instruction, wherein the area division instruction is used to instruct the controller to obtain a plurality of areas through division, and each area comprises one or more nodes;

the controller sends a first setting instruction to the first node, and sending a second setting instruction to the second node, wherein the first setting instruction comprises the identifier of the area in which the first node is located, and the second setting instruction comprises the identifier of the area in which the second node is located;

the first node receives the first setting instruction from the controller, and obtains the identifier of the area in which the first node is located; and the second node receives the second setting instruction from the controller, and obtains the identifier of the area in which the second node is located.

9. The system according to claim 7, wherein the first node is located in a first area, the second node is located in a second area; and the transmission system further comprises a controller, the controller creates, based on the first control routing information and the second control routing information, a first process corresponding to the first area and a second process corresponding to the second area; and the controller collects the link data information of the first node in the first process, and collects link data information of the second node in the second process.

10. The system according to claim 7, wherein the transmission system further comprises a controller, wherein during service provisioning, the controller configures, based on an initial node and a last node for service provisioning and link data information of one or more nodes, a parameter for the initial node, the last node, and the one or more nodes between the initial node and the last node, to create a service transmission channel between the initial node and the last node.

* * * * *

UNITED STATES PATENT AND TRADEMARK OFFICE
CERTIFICATE OF CORRECTION

PATENT NO. : 11,252,085 B2
APPLICATION NO. : 17/231621
DATED : February 15, 2022
INVENTOR(S) : Hanging Zhang et al.

It is certified that error appears in the above-identified patent and that said Letters Patent is hereby corrected as shown below:

On the Title Page

In item (72), in Column 1, in "Inventors", Line 1, delete "Hanging" and insert -- Hanqing --.

In the Claims

In Column 17, Line 53, in Claim 1, delete "comprising;" and insert -- comprising: --.

Signed and Sealed this
Twenty-fourth Day of May, 2022

*Katherine Kelly Vidal*

Katherine Kelly Vidal
*Director of the United States Patent and Trademark Office*